United States Patent [19]

Vercesi et al.

[11] Patent Number: 5,151,646
[45] Date of Patent: Sep. 29, 1992

[54] BATTERY-RECHARGING SYSTEM FOR A MOTOR VEHICLE

[75] Inventors: Roberto Vercesi; Roberto Bettini, both of Turin, Italy

[73] Assignee: Marelli Autronica SpA, Milan, Italy

[21] Appl. No.: 673,558

[22] Filed: Mar. 22, 1991

[30] Foreign Application Priority Data

Mar. 22, 1990 [IT] Italy .................. 67210 A/90

[51] Int. Cl.$^5$ .................................. H02J 7/04
[52] U.S. Cl. ............................... 322/28; 322/99
[58] Field of Search ............ 322/28, 99; 320/61, 320/64, 68

[56] References Cited

U.S. PATENT DOCUMENTS

| | | | |
|---|---|---|---|
| 3,942,097 | 3/1976 | Itoh et al. | 322/28 |
| 4,019,120 | 4/1977 | Fattic | 322/28 |
| 4,044,296 | 8/1977 | Dhyanchand et al. | 322/25 |
| 4,336,487 | 6/1982 | Tanaka et al. | 322/99 |
| 4,470,004 | 9/1984 | Morishita et al. | 322/99 |
| 4,607,246 | 8/1986 | Wada et al. | 322/99 X |
| 4,618,811 | 10/1986 | Mashino et al. | 322/28 |
| 4,755,734 | 7/1988 | Komurasaki et al. | 322/28 |

FOREIGN PATENT DOCUMENTS 0019864 12/1980 European Pat. Off. ............... 322/99

Primary Examiner—Steven L. Stephan
Assistant Examiner—Kristine Peckman
Attorney, Agent, or Firm—Sughrue, Mion, Zinn, Macpeak & Seas

[57] ABSTRACT

The system includes a current generator including an alternator and an associated rectifier whose output is connected by a cable to a terminal of a battery. A switch is connected to that terminal of the battery and an indicator lamp connected in series with the switch is switched on when no current is supplied by the generator. A voltage regulator is connected to the field winding of the generator and has first and second inputs connected to the output of the generator and to the lamp respectively. The voltage regulator includes a control circuit for monitoring the potential difference between the first and second inputs of the voltage regulator and for switching on the lamp if that potential difference is greater than a pre-established reference value when the generator is operating. This enables any interruption of the connection between the generator and the battery to be indicated to the user.

4 Claims, 2 Drawing Sheets

BATTERY-RECHARGING SYSTEM FOR A MOTOR VEHICLE

BACKGROUND OF THE INVENTION

The present invention relates to a battery-recharging system for a motor vehicle, including:

a current generator including an alternator comprising a stator winding, a field winding and a rectifier, the output of the generator being connected to a terminal of the battery by a cable, a switch connected to the said terminal of the battery, an indicator lamp connected in series with the switch and intended to be switched on when no current is supplied by the generator, and a voltage regulator with first and second inputs connected to the output of the generator and to the lamp respectively, the regulator also being connected to the field winding of the generator and being arranged to modulate the current supplied to the field winding in a predetermined manner in dependence on the voltage supplied by the generator.

A battery-charging system for a motor vehicle of the type specified above is described, for example, in British patent No. 2,164,508.

This known system cannot indicate any disconnection which may occur between the output of the generator and the battery and hence there is a risk that the battery may be discharged without warning.

SUMMARY OF THE INVENTION

The object of the present invention is to provide a battery-recharging system for a motor vehicle which overcomes this problem.

According to the invention, this object is achieved by means of a system of the type specified above, whose main characteristic lies in the fact that the voltage regulator includes control circuitry for monitoring the potential difference between the first and second inputs of the regulator and for switching on the lamp if that potential difference is less than a pre-established reference value when the generator is operating.

BRIEF DESCRIPTION OF THE DRAWING

Further characteristics and advantages of the invention will become clear from the detailed description which follows with reference to the appended drawings, provided purely by way of non-limiting example, in which.

DETAILED DESCRIPTION OF THE INVENTION

Figure 1:
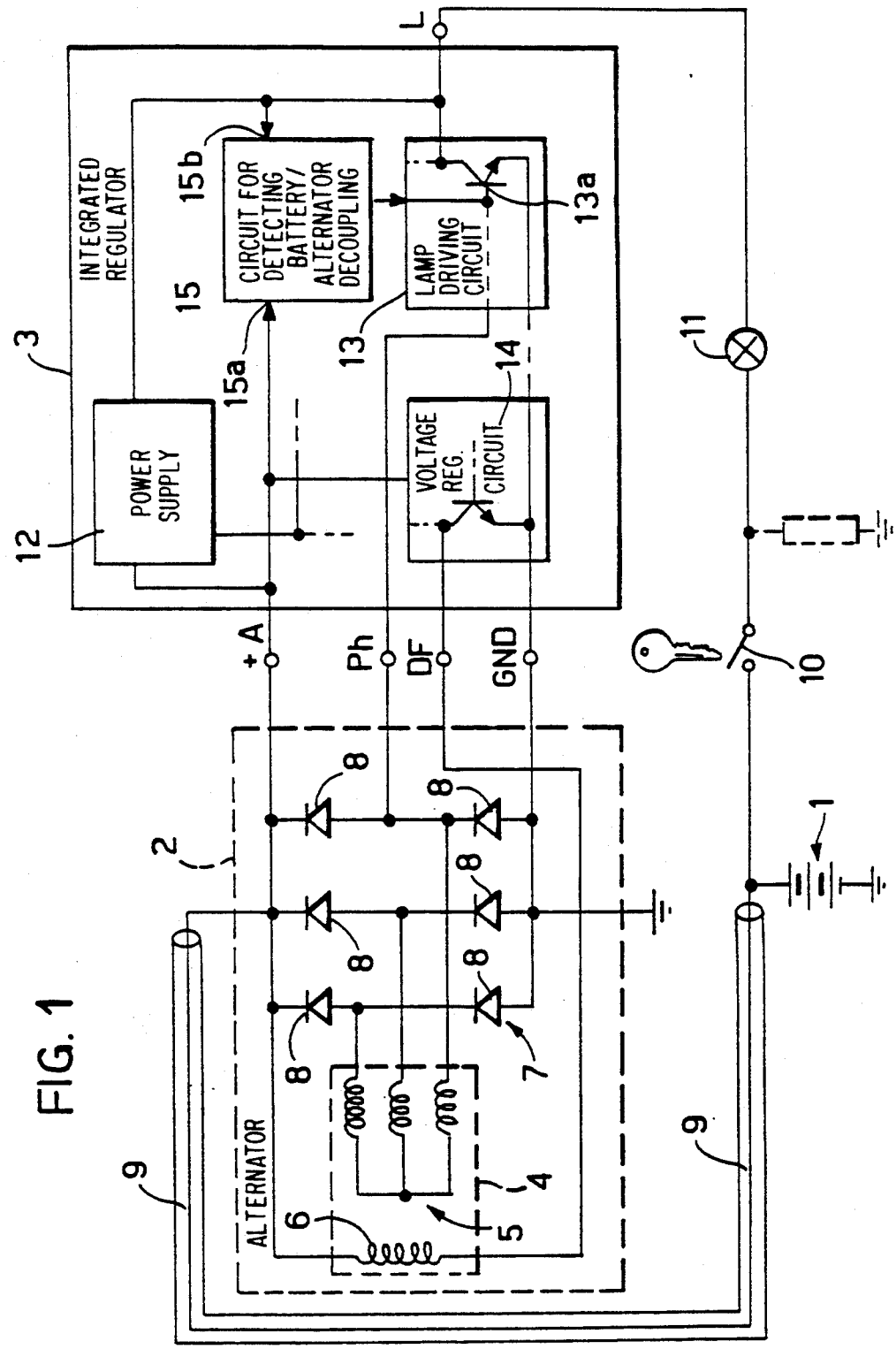
FIG. 1 diagram of a system according to the invention.

With reference to FIG. 1, the system according to the invention for recharging the battery 1 of a motor vehicle includes a current generator 2 and a voltage regulator, generally indicated 3, preferably in the form of an integrated circuit.

The generator 2 comprises, in known manner, an alternator 4 with a three-phase armature winding 5 (connected in a star arrangement in the embodiment shown) and a field winding 6. The armature winding 5 of the alternator is connected to a three-phase full-wave rectifier 7 formed by semiconductor diodes 8. The output of the rectifier 7, which constitutes the output of the generator 2 as a whole, is connected to a pole of the battery 1 by a connecting cable 9.

A switch, indicated 10, is connected to the positive pole of the battery 1 and is operable manually, for example, by a key. The switch may be incorporated, for example, in the ignition and starter switch of the motor vehicle. One terminal of an indicator lamp 11 is connected to the switch 10 and its other terminal is connected to an input L of the voltage regulator 3. The switch 10 and the lamp 11 are thus connected in series between the battery 1 and the input L of the regulator 3.

In known manner, the lamp 11 is intended to be switched on (lit) when the switch 10 is closed and no current is supplied by the generator.

The voltage regulator includes a voltage supply 12 and has a further 4 terminals indicated A, Ph, DF and GND, respectively.

The terminal A is connected to the output of the generator 2 and to an input of the supply 12.

The terminal Ph is connected to one phase of the armature winding 5 of the alternator 4.

The terminal DF is connected to one end of the field winding 6, the other end of that winding being connected to the output of the generator 2.

Finally, the terminal GND is connected to the earthed terminal of the rectifier circuit 7.

The integrated regulator includes, in known manner, a driver circuit 13 for the lamp 11. The input of this driver circuit 13 is connected to the terminal Ph and hence to one phase of the alternator 4. The driver also includes an output transistor 13a which is connected between the terminal L of the regulator and earth.

In operation, when the switch 10 is closed and the alternator 2 is stationary, the transistor 13 is made conductive in known manner and the lamp 11 is lit.

As soon as the alternator 4 is activated and the signal at the input Ph of the regulator exceeds the threshold of a comparator circuit within the driver circuit 13, the transistor 13a is made non-conductive and the lamp 11 consequently goes out.

The regulator 3 also includes (again in known manner) a voltage regulator circuit 14 with an input connected to the terminal A, and hence to the output of the generator, and its output connected to the terminal DF, and hence to the field winding 6. In known manner, the circuit 14 regulates the current in the field winding 6 of the alternator in a predetermined manner in dependence on the voltage supplied by the generator 2.

Finally, the voltage regulator 3 includes a control circuit 15 with a first input 15a connected to the terminal A and a second input 15b connected to the terminal L. The circuit 15 has an output connected to the driver circuit 13 of the lamp 11, for example, to the base of the final transistor 13a of that circuit.

In operation, the control circuit 15 monitors the potential difference between the terminals A and L of the regulator 3; if that potential difference exceeds a pre-established reference value when the generator 2 is operating, the circuit 15 makes the transistor 13a conductive, causing the lamp 11 to be lit.

This enables any disconnection between the output of the generator 2 and the battery 1, for example, as a result of the disconnection or breakage of the cable 9, to be detected and indicated. The user can thus take measures to prevent excessive discharge of the battery.

As will be explained further below with reference to FIG. 2, the circuit 15 can be arranged, in particular, to make the lamp 11 flash on and off when the potential difference between the terminals A and L exceeds the threshold.

Figure 2:
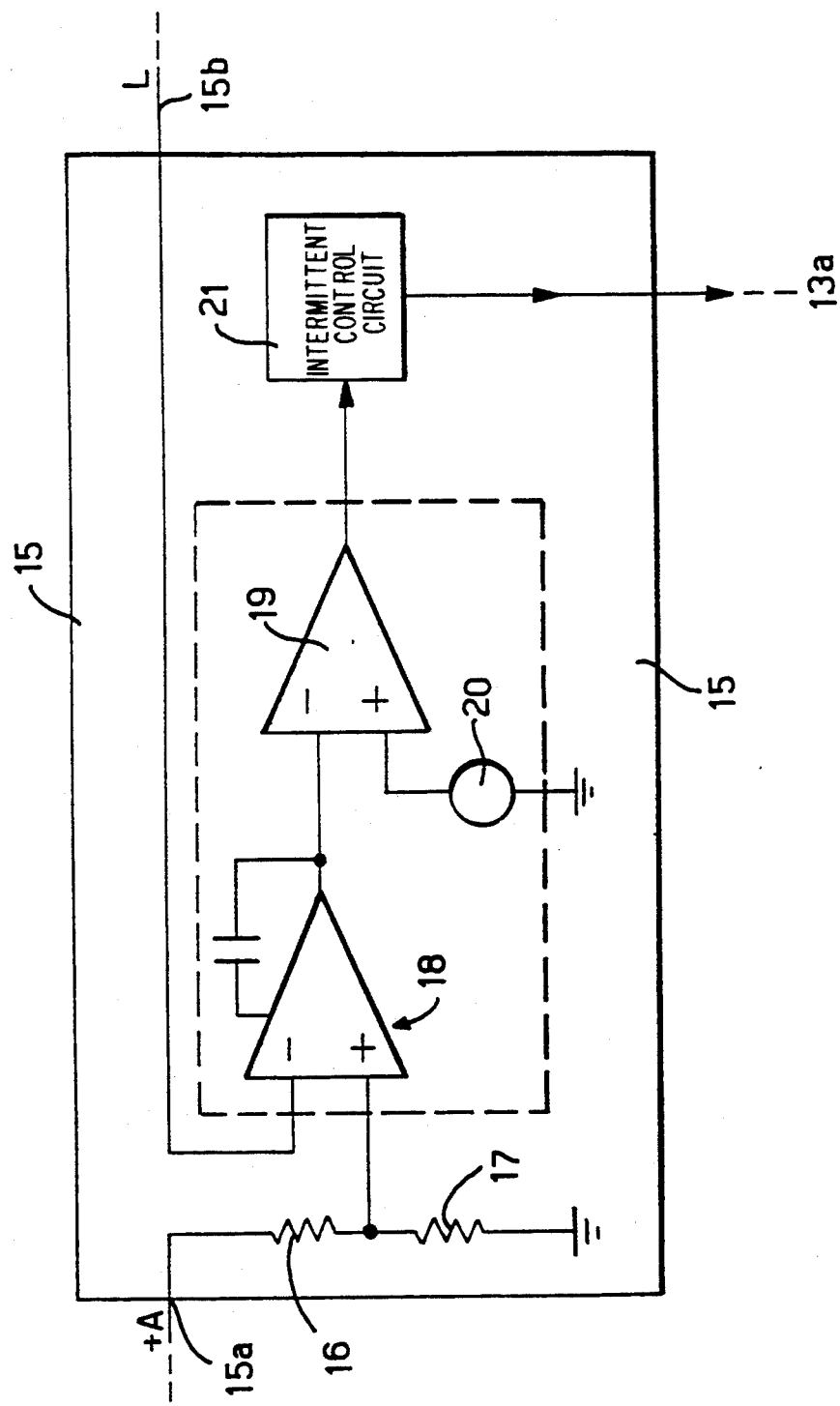
FIG. 2 is a diagram showing a circuit included in the system of FIG. 1 in greater detail.

With reference to FIG. 2, the circuit 15 may include, for example, a resistive voltage divider formed by two resistors 16 and 17 at its input between the terminal 15a and earth. This voltage divider is connected to a first input of a differential amplifier 18 formed, for example, with the use of an operational amplifier. The other input of the differential amplifier is connected to the input 15b of the circuit.

Preferably, the differential amplifier 18 preferably has an integrating effect so that it also acts, to advantage, as a filter for eliminating, or at least reducing, the ripple produced by the alternator.

The output of the differential amplifier 18 is connected to a first input of a threshold comparator 19 whose other input is connected to a reference-voltage source 20. When the signal output by the differential amplifier 18 exceeds the level of the signal supplied by the source 20, the comparator 19 activates an intermittent control circuit 21, for example an astable multivibrator, whose output is connected to the base of the transistor 13a which consequently makes the lamp 11 flash on and off.

As stated above, the output of the threshold comparator 19 could, however, be connected directly to the base of the transistor 13a so as to switch on the lamp 11 permanently should the battery 1 be disconnected from the generator 2.

Naturally, the principle of the invention remaining the same, the forms of embodiment and details of construction may be varied widely with respect to those described and illustrated purely by way of non-limiting example, without thereby departing from the scope of the present invention.

What is claimed is:

1. A battery-recharging system for a motor-vehicle, including,
    a generator comprising an alternator with a polyphase armature winding, a field winding and a polyphase rectifier whose output is connected to a terminal of a battery by a conductor;
    a switch connected to said terminal of the battery;
    an indicator lamp connected with the switch; and
    a control and regulator circuit for regulating a voltage output by the generator and for controlling operation of the indicator lamp;
    the control and regulator circuit including:
    a voltage regulating circuit having an input coupled to the output of said rectifier through a first terminal of said control and regulator circuit, and an output coupled to the field winding through a second terminal of the control and regulator circuit;
    a lamp driving circuit, independent of said voltage regulating circuit and having an input coupled to one phase of the armature winding of the generator through a third terminal of said control and regulator circuit, and one phase of said rectifier and
    a voltage monitoring circuit having a first input coupled to said first terminal of the control and regulator circuit, and a second, separate, input coupled to the battery through the switch and the indicator lamp; said voltage monitoring circuit being arranged for switching on the indicator lamp if the potential difference between the first and second inputs thereof is greater than a reference value when the generator is operating.

2. A battery-recharging system for a motor vehicle according to claim 1, wherein the voltage monitoring circuit further includes:
    a differential amplifier with first and second inputs which are the first and second inputs of the voltage monitoring circuit;
    a threshold comparator connected to the output of the differential amplifier and a circuit which controls the lighting of the lamp and is intended to be activated when a signal output by the differential amplifier exceeds the reference value associated with the comparator.

3. A battery-recharging system for a motor vehicle according to claim 2, wherein the voltage monitoring circuit further includes an intermittent control circuit which is activated by the threshold comparator to make the lamp flash on and off when the signal output by the differential amplifier exceeds the reference value.

4. A battery-recharging system for a motor vehicle according to claim 2, wherein the differential amplifier has an integrating effect.

* * * * *